United States Patent [19]

Hillig

[11] Patent Number: 4,788,162
[45] Date of Patent: Nov. 29, 1988

[54] COMPOSITE BY COMPRESSION

[75] Inventor: William B. Hillig, Ballston Lake, N.Y.

[73] Assignee: General Electric Company, Schenectady, N.Y.

[21] Appl. No.: 18,677

[22] Filed: Feb. 25, 1987

Related U.S. Application Data

[63] Continuation of Ser. No. 812,662, Dec. 23, 1985, abandoned.

[51] Int. Cl.$^4$ .................. C03C 10/04; C03C 14/00
[52] U.S. Cl. ............................................. 501/5; 501/7; 501/9; 501/32; 264/60
[58] Field of Search ............ 501/95, 32, 88, 5, 7, 501/9, 96, 97; 264/60

[56] References Cited

U.S. PATENT DOCUMENTS

| | | | |
|---|---|---|---|
| 4,279,654 | 7/1981 | Yajima et al. | 264/60 |
| 4,314,852 | 2/1982 | Brennan et al. | 501/88 |
| 4,324,843 | 4/1982 | Brennan et al. | 428/697 |
| 4,421,861 | 12/1983 | Claussen et al. | 501/105 |
| 4,464,192 | 8/1984 | Layden et al. | 501/95 |
| 4,464,475 | 8/1984 | Beall et al. | 501/8 |
| 4,524,100 | 6/1985 | Shimizv et al. | 428/325 |
| 4,542,109 | 9/1985 | Pasto | 501/98 |
| 4,543,345 | 9/1985 | Wei | 501/89 |
| 4,588,699 | 5/1986 | Brennan et al. | 501/9 |
| 4,626,461 | 12/1986 | Prewo et al. | 428/114 X |

OTHER PUBLICATIONS

Dodd, Dictionary of Ceramics p. 69 (1964).
Ceramics Bulletin, vol. 63, Dec. 1984, p. 1476.

*Primary Examiner*—Mark L. Bell
*Assistant Examiner*—Karl Group
*Attorney, Agent, or Firm*—Jane M. Binkowski; James C. Davis, Jr.; James Magee, Jr.

[57] ABSTRACT

A mixture of ceramic filler and a matrix forming silicate and/or aluminosilicate material is compressed at a temperature at which the matrix forming material is molten to produce a composite.

19 Claims, No Drawings

COMPOSITE BY COMPRESSION

This application is a continuation of application Ser. No. 812,662 filed Dec. 23, 1985, abandoned.

This invention relates to the production of a ceramic composite by compressing a mixture of ceramic filler and molten alkaline earth silicate or alkaline earth aluminosilicate.

One of the limitations in making ceramic matrix composites is how to introduce the matrix phase in a way that avoids excessive porosity due to shrinkage during processing. This is particularly a problem where the filler or reinforcing phase is filamental or plate-like. Sintering, or sol-gel processes result in large shrinkage away from the reinforcing phase and, therefore, are not satisfactory procedures. Glass or crystallizable glass as the matrix overcomes this problem, and has been successfully used to make composites. However, such a matrix has a relatively limited upper service temperature because of softening of the relatively large amount of residual glass, or dissolution of the crystalline phases. Thus, 1100° C. is generally the maximum use temperature.

The present solution to finding a suitable ceramic matrix and associated process capable of service to much higher temperatures is through the use of molten alkaline earth silicate or aluminosilicate having a solidus temperature in excess of the proposed use temperature. A matrix composition corresponding to a congruently melting silicate or aluminosilicate is preferable. Departures from such composition would result in the formation of liquid at the solidus temperature which lies below the congruent melting temperature, decreasing the upper use temperature accordingly.

$CaSiO_3$ having a melting point of 1530° C., is a desirable matrix material. It forms anisotropic crystals which upon fracture tend to produce sliver-like fragments. Hence, this material has been utilized as an asbestos substitute.

One of the problems with oxide melts is that they generally exhibit volumetric shrinkage upon solidification. However, $SrSiO_3$ is reported by D. A. Buechner and R. Roy, J. Am. Cer. Soc. 43, 52 (1960) to exhibit the unusual property of expansion upon freezing (like water, bismuth, and silicon). Furthermore, $SrSiO_3$ (melting point = 1580° C.) is isomorphous with the high temperature form of $CaSiO_3$ (pseudowallastonite) with which it forms a continuous range of solid solutions. Thus, by mixing these two silicates, a composition presumably exists which has zero shrinkage on solidification. Further, the addition of $SrSiO_3$ to $CaSiO_3$ stabilizes the latter against transformation to the low temperature modification. Both $SrSiO_3$ and the solid solution of $CaSiO_3$ and $SrSiO_3$ fracture in a similar mode to $CaSiO_3$.

Briefly stated, the present process for producing a composite comprised of from about 1% by volume to about 90% by volume of ceramic filler phase and from about 10% by volume to about 99% by volume of continuous polycrystalline matrix phase, said composite having a porosity of less than about 10% by volume, comprises forming a mixture of a ceramic filler and a material for forming said matrix phase in amounts required to produce said composite, said matrix-forming material being selected from the group consisting of barium silicate, calcium silicate, magnesium silicate, strontium silicate, zirconium silicate, barium aluminosilicate, calcium aluminosilicate, magnesium aluminosilicate, strontium aluminosilicate, lithium aluminosilicate, and mixtures thereof, and compressing said mixture at a temperature at which said matrix-forming material is molten under a pressure sufficient to produce said composite.

Briefly stated, the present composite has a porosity of less than 10% by volume and is comprised of a ceramic filler phase ranging in amount from about 1% by volume to about 90% by volume of said composite, and a continuous polycrystalline matrix phase selected from the group consisting of barium silicate, calcium silicate, magnesium silicate, strontium silicate, zirconium silicate, barium aluminosilicate, calcium aluminosilicate, magnesium aluminosilicate, strontium aluminosilicate, lithium aluminosilicate and mixtures and/or solid solutions thereo, said polycrystalline matrix phase ranging in amount from about 10% by volume to about 99% by volume of the composite.

The present ceramic filler is a polycrystalline inorganic material which is a solid at processing temperature. Specifically, the ceramic filler of the composite has the characteristic of being stable at the temperatures necessary for processing or it is not significantly affected by the processing temperatures. In the present process, the ceramic filler is sufficiently inert so that no significant reaction, and preferably no reaction detectable by scanning electron microscope, occurs between it and the matrix-forming material. The present process has no significant effect on the ceramic filler. Generally, the filler functions as a reinforcing, toughening, matrix grain size controlling material and/or abrasion resisting material.

The particular ceramic filler or mixture of fillers used depends largely on the particular properties desired in the composite. Preferably, the ceramic filler is a carbide, nitride, boride, silicide or other similar ceramic refractory material. Ceramic oxides are not useful as fillers in the present invention.

Representative of ceramic carbides useful in the present process is the carbide of boron, chromium, hafnium, niobium, silicon, tantalum, titanium, vanadium, zirconium, and mixtures and solid solutions thereof. For example, the useful carbides include $B_4C$, $Cr_3C_2$, HfC, NbC, SiC, TaC, TiC, VC and ZrC.

Representative of the ceramic nitrides useful in the present process is the nitride of hafnium, niobium, silicon, tantalum, titanium, vanadium, zirconium, and mixtures and solid solutions thereof. For example, the useful nitrides include HfN, NbN, $Si_3N_4$, TaN, TiN, VN and ZrN.

Examples of ceramic borides are the borides of hafnium, niobium, tantalum, titanium, vanadium, zirconium, and mixtures and solid solutions thereof. More specifically, representative of the useful borides are $HfB_2$, NbB, $NbB_2$, TaB, $TaB_2$, $TiB_2$, VB, $VB_2$ and $ZrB_2$. Examples of useful silicides are $TaSi_2$, $MoSi_2$ and $WSi_2$.

The filler can be in any desired form such as, for example, a powder or filament or mixtures thereof. Generally, when the filler is in the form of a powder, it is characterized by a mean particle size which generally ranges from about 0.1 micron to about 1000 microns, preferably from about 0.2 micron to about 100 microns, and more preferably from about 0.5 micron to about 25 microns.

In one embodiment of the present invention, to produce a composite of particular microstructure, a particle size distribution of filler powder can be used with fractions of coarse or coarser particles being admixed with fractions of fine or finer particles so that the fine particles fit into the voids between the large particles and improve packing. Optimum distribution is determinable empirically.

As used herein, filament includes a whisker or discontinuous or continuous fiber of filler. Generally, the discontinuous filaments have an aspect ratio of at least 10, and in one embodiment of the present invention it is higher than 50, and yet in another embodiment it is higher than 1000. Generally, the lower the aspect ratio of the filament, the higher is the packing which can be achieved in the composite since the small filaments intertwine or interlock. Also, generally, the higher the aspect ratio of the discontinuous fiber for a given volume fraction of filament the better are the mechanical properties of the composite. In cases where the filaments are continuous in length, a large packing fraction is possible, for example, by arranging them in parallel or weaving them into cloth. Generally, the filament ranges from about 0.1 micron to about 20 microns in diameter and from about 10 microns to about 10 centimeters in length.

The filaments are used to impart desirable characteristics to the composite, such as improved stiffness strength, and toughness. In general, the greater the packing density of filaments, the greater is the improvement of such properties. Also, fibers with large aspect ratios usually are more effective in producing such improvement than are fibers having small aspect ratios.

In one embodiment of the present process, a mixture of filler powder and filaments is used to produce a composite of desired mechanical strength or microstructure. The particular desired mixture of powder and filaments is determinable empirically.

A mixture of ceramic filler powders or filaments of distributed size or a mixture of powder and filaments can be produced by a number of conventional techniques. For example, fractions of filler powders of distributed size or powder and filaments can be admixed in water under ambient conditions using, for example, an ultrasonic horn, and the resulting dispersion can be dried in air at ambient temperature.

The ceramic filler in the present mixture has a particle or filament size, or a ratio of filaments and powder which is predetermined by the particular microstructure or properties desired in the resulting composite.

In the present process, the matrix-forming material is selected from the group consisting of barium silicate, calcium silicate, magnesium silicate, strontium silicate, zirconium silicate, barium aluminosilicate, calcium aluminosilicate, magnesium aluminosilicate, strontium aluminosilicate, lithium aluminosilicate and mixtures thereof.

The present alkaline earth silicate can be represented as $BaSiO_3$, $CaSiO_3$, $MgSiO_3$ $SrSiO_3$, $2BaO.SiO_2$, $2BaO.3SiO_2$, $BaO.2SiO_2$, $2CaO.SiO_2$, $3CaO.2SiO_2$, $2MgO.SiO_2$ and $2SrO.SiO_2$, wherein each oxidic constituent can vary from the stoichiometric formula. The present alkaline earth silicate can also be represented in terms of its oxidic constituents, i.e. MO and $SiO_2$, by the general formula of $xMO.zSiO_2$ where M=Ba, Ca, Mg, Sr and mixtures thereof, and where x is 1, 2 or 3 and z is 1, 2 or 3. Each oxidic constituent in such stoichiometric formula can range up to ±50%, preferably less than ±10%, from its stoichiometric composition.

The zirconium silicate is zircon, $ZrO_2.SiO_2$, wherein each oxidic constituent, i.e. $ZrO_2$ and $SiO_2$, can range up to ±50%, preferably less than ±10%, from its stoichiometric composition.

The present alkaline earth aluminosilicate can be represented as $BaO.Al_2O_3.2 SiO_2$, $2 CaO.Al_2O_3.SiO_2$, $CaO.Al_2O_3.2 SiO_2$, $2 MgO.2 Al_2O_3.5 SiO_2$, $4 MgO.5 Al_2O_3.2 SiO_2$, $SrO.Al_2O_3.SiO_2$, $2 SrO.Al_2O_3.SiO_2$ and $6 SrO.9 Al_2O_3.2 SiO_2$ wherein each oxidic constituent can vary from the stoichiometric formula. The present alkaline earth aluminosilicate can also be represented in terms of its oxidic constituents, i.e. M'O, $Al_2O_3$ and $SiO_2$, by the general formula $xM'O.yAl_2O_3.zSiO_2$ where M'=Ba, Ca, Mg, Sr and mixtures thereof, where x is 1, 2, 4 or 6, y is 1, 2, 5 or 9 and z is 1, 2 or 5. Each oxidic constituent in such stoichiometric formula can range up to ±50%, preferably less than ±10%, from its stoichiometric composition.

Preferably, the lithium aluminosilicate is spodumene, $Li_2O.Al_2O_3.4SiO_2$ or eucryptite, $Li_2O.Al_2O_3.2SiO_2$, wherein each oxidic constituent, i.e. $Li_2O$, $Al_2O_3$ and $SiO_2$, can range up to ±50%, preferably less than ±10%, from its stoichiometric composition.

In carrying out the present process, a uniform or at least a substantially uniform mixture is formed of the components, i.e. filler and matrix-forming material. The components are used in the amounts required to form the particular composite desired. In the present process, the ceramic filler is used in an amount which produces a composite wherein the phase of filler ranges from about 1% by volume to about 90% by volume of the total volume of the composite. The matrix-forming material is used in an amount which produces a composite wherein the polycrystalline matrix phase ranges from about 10% by volume to about 99% by volume of the total volume of the composite. Generally, in the present process, there is no significant loss of the components used in forming the present composite.

Preferably, to insure the production of a composite wherein the matrix phase is uniformly or at least significantly uniformly distributed, the matrix-forming material should not be significantly larger in size than the ceramic filler or the mean size of the space between the filler particles or fibers in the composite. Preferably, the matrix-forming material has a particle size comparable to or at least substantially equivalent to the particle or filament size of the ceramic filler. More preferably, the matrix-forming material is of a particle size smaller or significantly smaller than that of the ceramic filler.

The components can be admixed by a number of conventional techniques such as, for example, ball milling, or ultrasonic dispersion, to produce a uniform or substantially uniform mixture. The more uniform the mixture, the more uniform is the microstructure, and therefore, the properties of the resulting composite.

Representative of these mixing techniques is ball milling. Milling may be carried out dry or with the charge suspended in a liquid medium inert to the ingredients. Typical liquids include ethyl alcohol and acetone. Wet milled material can be dried by a number of conventional techniques to remove the liquid medium.

In carrying out the present process, the mixture is compressed at a temperature at which the matrix-forming material is molten under a pressure at least sufficient to produce the present composite. Preferably, compression of the mixture is carried out by hot pressing or injection molding.

Generally, the compression temperature ranges from the temperature at which the matrix-forming material is molten to a temperature at which there is no significant vaporization of the matrix-forming material. Specifically, the present matrix-forming material has a melting point ranging from about 1250° C. to about 1850° C., and preferably from about 1400° C. to about 1700° C.

Generally, as the temperature is increased from the melting temperature, the viscosity of the matrix-forming material decreases. At compression temperature, the matrix-forming material has a viscosity of less than about 1000 poises, preferably less than about 100 poises, and more preferably less than about 10 poises. The particular compression temperature is determinable empirically, but generally it ranges from about 1300° C. to about 1900° C., and preferably from about 1350° C. to about 1750° C. Preferably, to prevent significant vaporization of the matrix-forming material, compression is carried out at as low a temperature as possible, and preferably no higher than about 50° C. above the melting point of the matrix-forming material. Compression time can vary and depends largely on the viscosity of the melt, the proportion of matrix to ceramic filler and the particle size distribution of the ceramic filler.

Preferably, compression of the mixture is carried out in a protective atmosphere or vacuum in which the ceramic filler and matrix-forming material are inert or substantially inert, i.e., an atmosphere or vacuum which has no significant deleterious effect thereon. Specifically, since reaction between the ceramic filler and matrix-forming material degrades the mechanical properties of the resulting composite, a protective atmosphere or vacuum preferably is one in which no significant reaction, or no reaction detectable by scanning electron microscopy, between the filler and matrix-forming material takes place. A particular protective atmosphere or vacuum is determinable empirically and depends largely on the specific compression technique and the ceramic filler used. The protective atmosphere or vacuum can be comprised of or contain nitrogen, a noble gas, preferably argon or helium, and mixtures thereof. However, when the filler is a ceramic carbide, the protective atmosphere or vacuum preferably contains at least a partial pressure of carbon monoxide determinable empirically or by thermodynamic calculation which is at least sufficient to prevent reaction or significant reaction between the carbide and matrix-forming material. Also, when the filler is a ceramic nitride, the protective atmosphere or vacuum preferably contains at least a partial pressure of nitrogen determinable empirically or by thermodynamic calculation which is at least sufficient to prevent reaction or significant reaction between the nitride and the matrix-forming material, and preferably the atmosphere is nitrogen.

Hot Pressing Embodiment

In this embodiment, the mixture of ceramic filler and matrix forming material is hot pressed under a pressure and temperature and for a sufficient period of time to produce the present composite. Conventional hot pressing equipment may be used. Preferably, hot pressing is carried out in a carbon press.

If desired, the mixture initially can be pressed in a conventional manner, generally by die pressing at room temperature, to produce a desired compressed form or preform before it is placed in the hot press.

In one embodiment, the composite produced by hot pressing is comprised of ceramic filler phase ranging from greater than about 70% by volume to about 90% by volume and the present continuous polycrystalline matrix phase ranging from about 10% by volume to less than about 30% by volume of the composite.

In another embodiment, the composite produced by hot pressing is comprised of ceramic filler phase ranging from about 1% by volume to less than about 5% by volume and the present continuous polycrystalline matrix phase ranging from about 99% by volume to greater than about 95% by volume of the composite.

Injection Molding Embodiment

In this embodiment the present mixture is injection molded to produce the present composite. Conventional injection molding equipment may be used.

For injection molding, the ceramic filler generally ranges from about 40% by volume to about 60% by volume of the mixture. To carry out the injection molding, sufficient heat and pressure is applied to the present mixture to force it to flow to the desired degree, i.e. to force it into a die producing the present composite in a desired shape and size. Specifically, the mixture is heated to a temperature at which the matrix-forming material is molten and under a pressure which can vary widely and is determinable empirically, the molten mixture is forced into a die where it is allowed to cool and harden and then removed from the die. Generally, the pressure ranges from about 1000 psi to about 30,000 psi. Preferably, the die is preheated to roughly from about 30° C. to about 60° C.

When compression is completed, the rate of cooling can vary, but it should have no significant deleterious effect on the composite. Specifically, cooling should be at a rate which avoids cracking of the resulting composite, and this is determinable empirically depending largely on the geometry and size of the piece. Generally, a cooling rate of less than about 50° C. per minute is useful for small bodies of simple shape and a cooling rate as great as about 20° C. per minute or higher is useful for large bodies of complex shape. Preferably, the composite is cooled to ambient temperature prior to removal from the compression equipment.

Any excess matrix-forming material on the surface of the composite can be removed by a number of techniques, such as, for example, by gentle scraping or abrading.

Preferably, the present composite does not contain any reaction product of ceramic filler and matrix which is detectable by scanning electron microscopy.

The present composite has a porosity of less than about 10% by volume, preferably less than about 5% by volume, more preferably less than 1% by volume, and most preferably, it is pore-free, i.e., it is fully dense.

The present composite is comprised of from about 1% by volume to about 90% by volume, preferably from about 5% by volume to about 70% by volume, and more preferably from about 25% by volume to about 65% by volume, of ceramic filler phase and from about 99% by volume to about 10% by volume, preferably from about 95% by volume to about 30% by volume, and more preferably from about 75% by volume to about 35% by volume, of continuous matrix phase. Generally, the composition of the continuous matrix phase is substantially the same or not significantly or substantially different from that of the infiltrant.

Specifically, in one embodiment, the continuous matrix phase is comprised of a silicate selected from the group consisting of $BaSiO_3$, $CaSiO_3$, $MgSiO_3$, $SrSiO_3$, 2BaO.SiO$_2$,2BaO.3SiO$_2$, BaO.2SiO$_2$,2CaO.SiO$_2$, 3CaO.2SiO$_2$, 2MgO.SiO$_2$,2SrO.SiO$_2$, and mixtures and/or solutions thereof wherein each oxidic constituent can vary from the stoichiometric formula. The alkaline earth silicate can also be represented in terms of its oxidic constituent by the general formula xMO.zSiO$_2$ where M=Ba, Ca, Mg, Sr and mixtures and/or solutions thereof. Each oxidic constituent in such stoichiometric formula can range up to ±50%, but preferably less than ±10%, from its stoichiometric composition.

The continuous matrix can also be comprised of zirconium silicate, preferably zircon, ZrO$_2$.SiO$_2$, wherein each oxidic constituent can range up to ±50%, preferably less than ±10%, from its stoichiometric composition.

Also, the continuous matrix phase can be comprised of an alkaline earth aluminosilicate selected from the group consisting of BaO.Al$_2$O$_3$.2SiO$_2$, 2 CaO.Al$_2$O$_3$.SiO$_2$, CaO.Al$_2$O$_3$.2 SiO$_2$, 2 MgO.2 Al$_2$O$_3$.5 SiO$_2$, 4 MgO.5 Al$_2$O$_3$.2 SiO$_2$, SrO.Al$_2$O$_3$.2 SiO$_2$, 2 SrO.Al$_2$O$_3$.SiO$_2$, 6 SrO.9 Al$_2$O$_3$.2 SiO$_2$, and mixtures and/or solutions thereof wherein each oxidic constituent can vary from the stoichiometric formula. The alkaline earth aluminosilicate can also be represented in terms of its oxidic constituents by the general formula xM'O.yAl$_2$O$_3$.zSiO$_2$ where M'=Ba, Ca, Mg, Sr and mixtures and/or solution thereof, where x is 1, 2, 4 or 6, y is 1, 2, 5 and 9 and z is 1, 2 and 5. Each oxidic constituent in such stoichiometric formula can range up to ±50%, but preferably less than ±10%. from its stoichiometric composition.

In addition, the continuous matrix can be comprised of lithium aluminosilicate which preferably is spodumene, Li$_2$O. Alhd 2O$_3$.4SiO$_2$, or eucryptite, Li$_2$O.Al$_2$O$_3$.2SiO$_2$, wherein each oxidic constituent can range up to +50%, preferably less than +10%, from its stoichiometric composition.

Generally, in the present composite, the continuous matrix phase is distributed evenly or substantially evenly through the composite. In the present composite, the continuous matrix phase is interconnecting and generally envelops more than 25% by volume, preferably more than 50% by volume, of the individual filler members, i.e., particles and/or filaments.

The present composite may contain an amorphous glassy phase, generally in an amount of less than about 5% by volume, preferably less than about 2% by volume, and more preferably less than about 1% by volume, of the composite. Even more preferably, the present composite contains only a detectable amount of glassy phase. Ideally the composite would contain no glassy phase. The amount of glassy phase in the composite depends largely on the impurities in the starting materials.

The present composite has a number of uses. For example, it is useful as a high temperature structural material, as a vane, and as a wear resistant part such as a bushing.

The invention is further illustrated by the following examples where the procedure was as follows unless otherwise noted:

The alkaline earth silicates and alkaline earth aluminosilicates were of Reagent Grade.

The CaSiO$_3$ powder had an average particle size of about 2 microns.

The SiC powder ranged in particle size from about 2 to 5 microns.

The SiC whiskers ranged from 0.3 to 1 micron in diameter and had an aspect ratio of about 100:1.

Heating rate to the maximum hot pressing temperature was about 200° C. per minute.

At the completion of hot pressing, the hot pressed body was furnace cooled to ambient temperature.

The total porosity of each composite was determined in a standard manner.

The composition of the alkaline earth silicate phase or alkaline earth aluminosilicate phase in the resulting composite did not differ significantly from that of the given matrix-forming material, i.e. each oxidic constituent of the continuous matrix phase may have ranged less than ±5% from its stoichiometric composition in the given stoichiometric formula for the given matrix-forming material.

EXAMPLE 1

2 grams each of 600 mesh SiC and of wollastonite (CaSiO$_3$) powdered to pass through a 200 mesh screen were thoroughly mixed. The powders were placed in a 0.500 inch inner diameter tubular graphite die between matching graphite plungers. This assembly was placed inside an induction heating coil located within a gas-tight chamber. An hydraulically powered cylinder passed through the bottom of the chamber allowing a force to be exerted on the carbon die plungers. The chamber was filled with flowing nitrogen gas at atmospheric pressure, and the hydraulic cylinder was pressurized to cause a pressure on the carbon die plunger of 2800 psi. The carbon die assembly was heated inductively to a maximum temperature of 1580° C. over a period of 11 minutes, and the temperature 1580° C. was maintained for 3 minutes prior to shutting off the power. At ambient temperature the resultant disc shaped pellet, i.e. composite, had a density of 3.355 grams per cubic centimeter, and an open porosity of 0.2%.

The composite was comprised of roughly equivalent amounts of polycrystalline silicon carbide phase and a continuous polycrystalline matrix phase which was distributed substantially evenly in the composite.

EXAMPLE 2

The procedure and apparatus used in this example were substantially the same as disclosed in Example 1.

A mixture of 0.5 gram of silicon carbide rice-hull-derived whiskers and 1.5 grams of a powder fused material having the composition of cordierite (2MgO.2Al$_2$O$_3$.5SiO$_2$) were suspended in water and thoroughly mixed. The suspension was filtered and the residue placed in a 0.500 inch inner diameter tubular graphite die and associated apparatus as disclosed in Example 1. The graphite die assembly was heated inductively to 1170° C. over the course of 5 minutes with a pressure of 2800 psi applied to the powder mixture contained in the die. The pressure was then raised to 5600 psi and heating continued to 1300° C. over the course of two minutes, whereafter the temperature was held in the range 1300°–1310° C. for two minutes prior to shutting off the power.

The pellet, i.e. composite, was comprised of polycrystalline silicon carbide phase and a continuous polycrystalline matrix phase which was distributed substantially evenly in the composite. X-ray analysis of the pellet showed it to be comprised of silicon carbide and high cordierite.

U.S. Pat. No. 4,725,567. filed about Nov. 29, 1985 for COMPOSITE BY INFILTRATION, by W. B. Hillig, and assigned to the assignee hereof and incorporated herein by reference discloses a composite produced by shaping a ceramic filler into a porous compact and infiltrating the compact with liquid alkaline earth silicate or alkaline earth aluminosilicate.

U.S. Ser. No. 740,444, filed June 3, 1985, for COMPOSITE OF $Si_3N_4$ BY INFILTRATION, by M. K. Brun and W. B. Hillig, and assigned to the assignee hereof and incorporated herein by reference discloses a composite produced by infiltrating the open pores of a polycrystalline silicon nitride body with a member selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride and a mixture of said fluoride and a metal oxide.

U.S. Ser. No. 759,815, filed July 29, 1985 for COMPOSITE BY INFILTRATION, by W. B. Hillig, and assigned to the assignee hereof and incorporated herein by reference discloses the production of a composite by forming a porous compact of a ceramic member selected from the group consisting of boron carbide, hafnium carbide, hafnium nitride, niobium carbide, niobium nitride, silicon carbide, silicon nitride, tantalum carbide, tantalum nitride, titanium carbide, titanium nitride, vanadium carbide, vanadium nitride, zirconium carbide and zirconium nitride, and infiltrating the compact with a member selected from the group consisting of barium fluoride, calcium fluoride, magnesium fluoride, strontium fluoride, cerium fluoride, dysprosium fluoride, gadolinium fluoride, lanthanum fluoride, samarium fluoride, yttrium fluoride, and a mixture of said fluoride with a metal oxide.

What is claimed and sought to be protected by Letters Patent of the United States is as follows:

1. A process for producing a composite having a composition consisting essentially of from about 1% by volume to about 90% by volume of polycrystalline inroganic filler phase consisting essentially of particles and/or filaments and from about 10% by volume to about 99% by volume of continuous interconnecting polycrystalline alkaline earth silicate matrix phase, said composite containing amorphous glassy phase in an amount of less than aobut 5% by volume of said composite, said matrix phase enveloping more than 50% by volume of the individual filler particles and/or filaments, said composite having a porosity of less than about 10% by volume, which consists essentially of forming a mixture consisting essentially of a polycrystalline inorganic filler in the form of particles and/or filaments and an alkaline earth silicate in amounts required to produce said composite said filler being selected from the group consisting of boron carbide, chromium carbide, hafnium carbide, niobium carbide, silicon carbide, tantalum carbide, titanium, carbide, vanadium carbide, zirconium carbide, hafnium nitride, niobium nitride, silicon nitride, tanttalum nitride, titanium nitride, vanadium nitride, zirconium nitride, hafnium boride, niobium boride, tantalum boride, titanium boride, vanadium boride, zirconium boride, $TaS_2$, $MoSi_2$, $WSi_2$ and a mixture thereof, said alkaline earth silicate being represented by the stoichiometric formula $xMO/ZSiO_2$ where M=Ba, Ca, Mg, Sr and a mixture thereof, where x is 1, 2 or 2 and z is 1, 2 or 3, and wherein said MO and $SiO_2$ constituent of said stoichiometric formula ranges to less than ±10% from said stoichiometric formula, said alkaline earth silicate having a melting point ranging from about 250° C. to about 1850° C., said filler being a solid in said process and not significantly affected by said process, and compressing said mixture at a temperature at which said alkaline earth silicate is molten ranging from about 1300° C. to about 1900° C. under a pressure sufficient to produce a product having the composition of said composite, said compressing being carried out in a protective atomosphere or vacuum in which said filler and alkaline earth silicate are substantially inert thereby producing said composite free of reaction product detectable by scanning electron microscopy of said filler and alkaline earth silicate, and cooling said product to produce said composite.

2. The process according to claim 1 wherein said filler is a ceramic carbide selected from the group consisting of boron carbide, hafnium carbide, niobium carbide, silicon carbide, tantalum carbide, titanium carbide, vanadium carbide, zirconium carbide and a mixture thereof.

3. The process according to claim 1 wherein said filler is a ceramic nitride selected from the group consisting of hafnium nitride, niobium nitride, silicon nitride, tantalum nitride, titanium nitride, vanadium nitride, zirconium nitride and a mixture thereof.

4. The process according to claim 1 wherein said composite is comprised of from about 35% by volume to about 75% by volume of said continuous matrix phase and about 25% by volume to about 65% by volume of said filler phase.

5. The process according to claim 1 wherein said filler consists essentially of particles.

6. The process according to claim 1 wherein said filler consists essentially of filaments.

7. The process according to claim 1 wherein said filler consists essentially of a mixture of particles and filaments.

8. The process according to claim 1 wherein said filler is a ceramic boride selected from the group consisting of $HfB_2$, $NbB$, $NbB_2$, $TaB$, $TaB_2$, $TiB_2$, $VB$, $VB_2$, $ZrB_2$ and a mixture thereof.

9. The process according to claim 1 wherein said filler is a silicide selected from the group consisting of $TaSi_2$, $MoSi_2$ and a mixture thereof.

10. A process for producing a composite having a composition consisting essentially of from about 40% by volume to about 60% by volume of polycrystalline inorganic filler phase consisting essentially of particles and/or filaments and from about 40% by volume to about 60% by volume of continuous interconnecting polycrystalline alkaline earth silicate matrix phase, said composite containing amorphous glassy phase in an amount of less than about 5% by volume of said composite, said matrix phase enveloping more than 50% by volume of the individual filler particles and//or filaments, said composite having a porosity of less than about 10% by volume, which consists essentially of forming a mixture of a polycrystalline inorganic filler in the form of particles and/or filaments and an alkaline earth silicate in amounts required to produce said composite, said filler being selected from the group consisting of boron carbide, chromium carbide, hafnium carbide, niobium carbide, silicon carbide, tantalum carbide, titanim carbide, vanadium carbide, zirconium carbide, hafnium nitride, niobium nitride, silicon nitride, tantalum nitride, titanium nitride, vanadium nitride, zirconium nitride, hafnium boride, niobium boride, tantalum boride, titanium boride, vanadium boride, zirconium boride, TaSi$_2$, MoSi$_2$, WSi$_2$ and a mixture thereof, said alkaline earth silicate being represented by the stoichiometric formula xMO.zSiO$_2$ where M=Ba, Ca, Mg, Sr and a mixture thereof, where x is 1, 2 or 3 and z is 1, 2 or 3, and wherein said MO and SiO$_2$ constituent of said stoichiometric formula ranges to less than ±10% from said stoichiometric formula, said alkaline earth silicate having a melting point ranging from about 1250° C. to about 1850° C., said filler being a solid in said process and not significantly affected by said process, and injection molding said mixture at a temperature at which said alkaline earth silicate is molten ranging from about 1300° C. to about 1900° C. under a pressure sufficient to produce a product having the composition of said composite, said injection molding being carried out in a protective atmosphere or vacuum in which said filler and alkaline earth silicate are substantially inert thereby producing said composite free of reaction product detectable by scanning electron microscopy of said filler and alkaline earth silicate, and cooling said product to produce said composite.

11. The process according to claim 10 wherein said filler is ceramic carbide selected from the group consisting of boron carbide, hafnium carbide, niobium carbide, silicon carbide, tantalum carbide, titanium carbide, vanadium carbide, zirconium carbide and a mixture thereof.

12. The process according to claim 10 wherein said filler is a ceramic nitride selected from the group consisting of hafnium nitride, niobium nitride, silicon nitride, tantalum nitride, titanium nitride, vanadium nitride, zirconium nitride and a mixture thereof.

13. The process according to claim 10 wherein said filler consists essentially of filaments.

14. A composite having a porosity of less than about 5% by volume consisting essentially of polycrystalline inorganic filler in the form of particles and/or filaments ranging in amount from greater than about 70% by volume to about 90% by volume of said composite, and a continuous interconnecting polycrystalline alkaline earth silicate matrix phase ranging in amount from about 10% by volume to less than about 30% by volume of said composite, said filler being selected from the group consisting of boron carbide, chromium carbide, hafnium, carbide, niobium, carbide, silicon carbide, tantalum carbide, titanium carbide, vanadium carbide, zirconium carbide, hafnium nitride, niobium nitride, silicon nitride, tantalum nitride, titanium nitride, vanadium nitride, zirconium nitride, hafnium boride, niobium boride, tantalum boride, titanium boride, vanadium boride, zirconium boride, TaSi$_2$, MoSi$_2$, WSi$_2$ and a mixture thereof, said alkaline earth silicate phase being represented by the stoichiometric formula xMO.zSiO$_2$ where M=Ba, Ca, Mg, Sr and a mixture and/or solution thereof, where x is 1, 2 or 3 and z is 1, 2 or 3, and wherein said MO and SiO$_2$ constitutent of said stoichiometric formula ranges less than ±10% from said stoichiometirc formula, said alkaline earth silicate phase enveloping more than 50% by volume of the individual filler particles and/or filaments, said alkaline earth silicate phase having a melting point ranging from about 1250° C. to about 1850° C., said composite containing an amorphous glassy phase in an amount of less than aobut 5% by volume of said composite, said composite being free of reaction product detectable by scanning electron microscopy of said filler and matrix phase.

15. The composite according to claim 14 wherein said filler is a ceramic carbide selected from the group consisting of boron carbide, hafnium carbide, niobium carbide, silicon carbide, tantalum carbide, titanium carbide, vanadium carbide, zirconium carbide and a mixture thereof.

16. The composite according to claim 14 wherein said filler is a ceramic nitride selected from the group consisting of hafnium nitride, niobium nitride, silicon nitride, tantalum nitride, titanium nitride, vanadium nitride, zirconium nitride and a mixture thereof.

17. The composite according to claim 14 wherein said filler is a ceramic boride selected from the group consisting of HfB$_2$, NbB, NbB$_2$, TaB, TaB$_2$, TiB$_2$, VB, VB$_2$, ZrB$_2$ and a mixture thereof.

18. The composite according to claim 14 wherein said filler is a silicide selected from the group consisting of TaSi$_2$, MoSi$_2$, WSi$_2$ and a mixture thereof.

19. The composite according to claim 14 wherein said filler consists of filaments.

* * * * *